Figure 5:
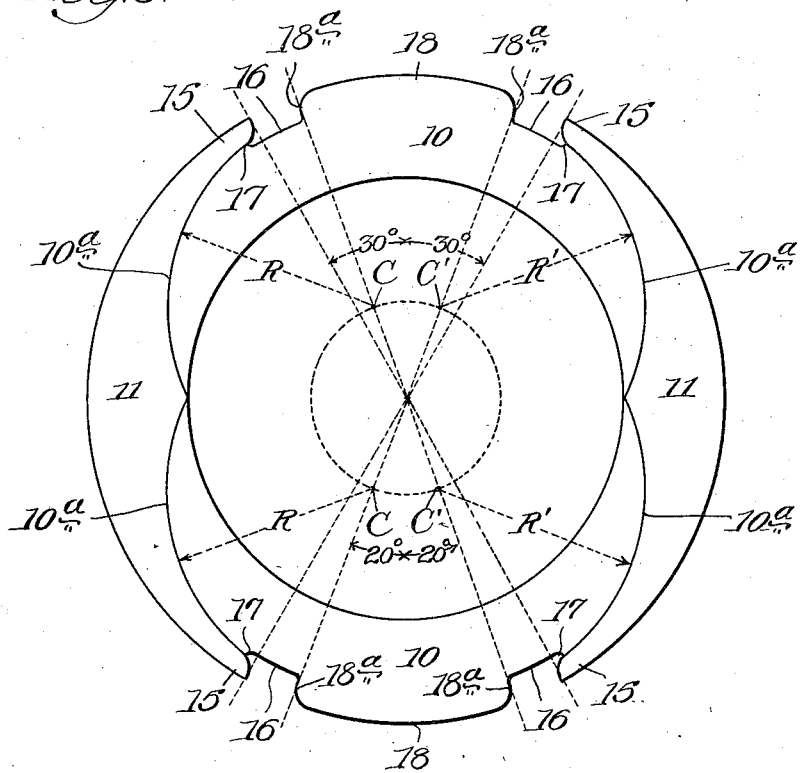

Nov. 12, 1929. J. LE MAY 1,735,466
PACKING
Filed Sept. 10, 1928  2 Sheets-Sheet 1
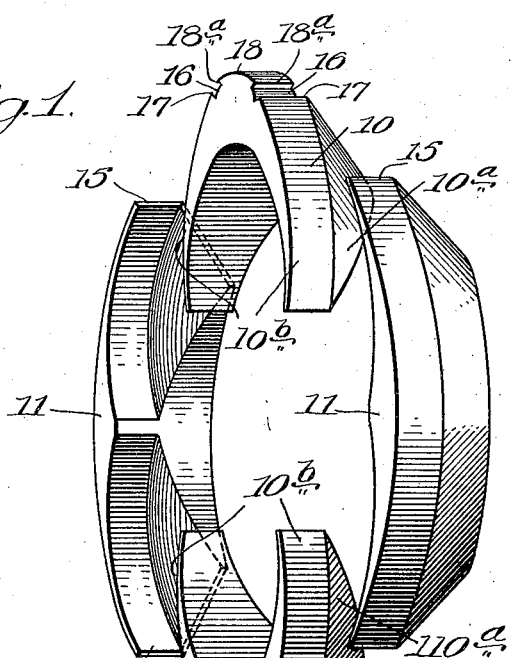
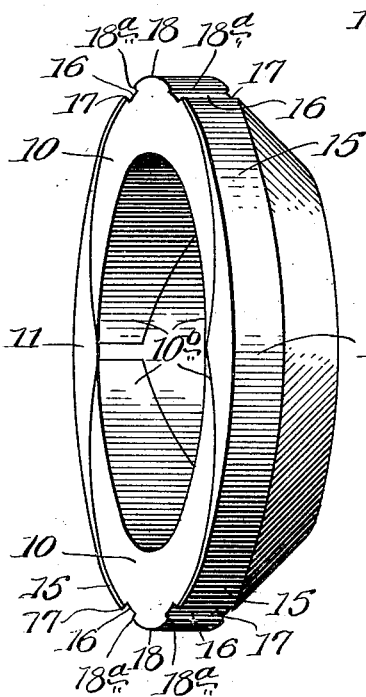
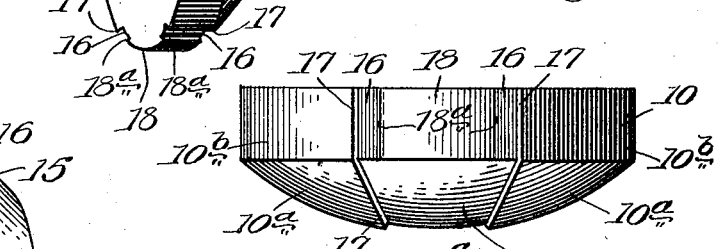
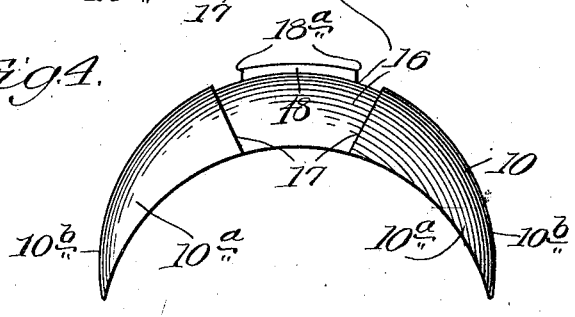

Nov. 12, 1929.                    J. LE MAY                    1,735,466
                                   PACKING
                            Filed Sept. 10, 1928        2 Sheets-Sheet 2

Patented Nov. 12, 1929

1,735,466

UNITED STATES PATENT OFFICE

JOHN LE MAY, OF AURORA, ILLINOIS, ASSIGNOR TO AURORA METAL COMPANY, OF AURORA, ILLINOIS, A CORPORATION OF ILLINOIS

PACKING

Application filed September 10, 1928. Serial No. 305,011.

This invention relates to improvements in packing, and more especially to that form of packing composed of two or more overlapping segments, such as is frequently used for packing the piston rods of locomotives.

The invention is here shown embodied in a form of packing comprising four crescent-shaped segments, including two larger, or outer, segments overlapping the ends of two smaller, or inner, segments. In this form of packing, the overlapping edges of the larger, or outer, segments advance on the surface of the smaller segments, as the packing wears in use.

The outer surfaces of the overlapped ends of the inner segment are ordinarily spherically, cylindrically, conically, or circularly curved, as shown, for example, in Schaefer Patent No. 871,068, dated November 12, 1907, and Christenson Patent No. 1,523,171, dated January 13, 1925. In both of these packings, however, shown in these patents, the curved surfaces on both ends of the inner segment are drawn with radii having a common center; that is, the curved surfaces on the outer faces of the inner segment at the two ends thereof are continuations of the same cylindrical, spherical or conical surface. It will be seen, therefore, that in such devices, the inner segment is not prevented from sliding around inside of the outer segments by such curved surfaces. One of the features of my invention is the making of such a segment having the outer surfaces of the overlapped ends of the inner segment circularly curved, the radii of curvature of the two ends having separated centers; that is, the curved surfaces of the two ends are not continuations of the same cylindrical, spherical or conical surface. By making these curved surfaces with radii having different centers, the boring of the packing is greatly facilitated. Ordinarily, this form of packing, after being assembled, must be bored for the piston rod. In this boring operation, heretofore, difficulty has been encountered by the inner segments slipping around out of place. By making the curved ends with radii having separated centers, such curved surfaces, being overlapped by the outer segments, prevents such displacement of the inner segments during the boring operation.

Another feature of my invention is the provision of recesses on the inner segments between the advancing edges of the outer segments, as shown in Christenson Patent 1,523,171; but I also provide on such recessed portions protuberances or extensions adapted to bear against the wall of the retaining cup, such protuberances operating to prevent longitudinal tipping or rocking of the inner segments when they are in place. These protuberances, however, are short enough so that, in the ordinary use of the packing, they are not engaged by the advancing edges of the overlapped segments. I, therefore, get all the advantages of the packing shown by Christenson in the patent referred to and obtain the additional advantage of the protuberance operating to prevent longitudinal tipping, rocking, or displacement of the inner segment.

Other features and advantages of my invention will appear more fully as I proceed with my specification.

Figure 6:
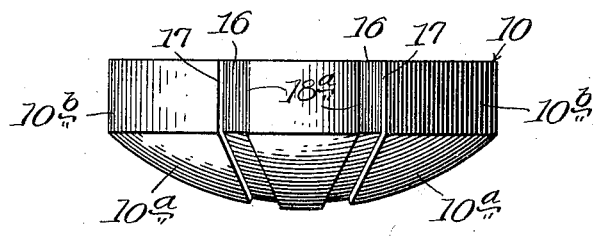

In that form of device embodying the features of my invention shown in the accompanying drawings, Fig. 1 is a view in perspective showing a four-segment packing comprising the unit packing, the four segments being shown in separated position; Fig. 2 is a similar view showing the same fitted together; Fig. 3 is a view in side elevation of one of the smaller, inner, or overlapped segments; Fig. 4 is a view of the same in front elevation; Fig. 5 is a diagrammatic view to aid in the illustration of the invention; and Fig. 6 is a view similar to Fig. 3 showing a slight modification.

As shown in the drawings, the unit packing comprises two smaller, or inner, segments 10, 10, overlapped at their ends by the curved inner surfaces of the ends of two larger, or outer, segments 11, 11. The outer surface of each end of the inner segment may be spherically, or conically curved in front, and cylindrically curved toward the rear, as indicated by $10^b$. As far as the invention is concerned, it is immaterial whether the outer surface of the ends of the inner segment in front are spherically or conically curved. Merely for purposes of illustration, I show such surfaces in Fig. 1 as being conical, as indicated by 110ª. In Figs. 3, 4 and 6, I have shown this surface as being spherical, as indicated by 10ª. It is to be especially noted, however, that the radii for the curved surfaces at the two ends of the inner segment have separated centers, and not common centers. This point is probably best illustrated by the diagrammatic view shown in Fig. 5. As shown in this figure, R indicates the radius, or radii, used for forming the curved surfaces 110ª, 10ª or 10ᵇ on one end of the inner segment 10, and R¹ indicates the corresponding radius, or radii, for forming such surfaces on the other end. It is to be noted that the centers for corresponding radii R and R¹ are separated, as indicated by C and C¹, respectively. Consequently, the curved surfaces 110ª, 10ª or 10ᵇ at the two ends of one inner segment 10 are not continuations of the same cylindrical, conical, or spherical surface, and consequently, when the inner segment is in place for boring, it is prevented by such curved surfaces from circular displacement during the boring operation. I have here shown the centers C and C¹ as separated circumferentially around the axis of the packing substantially forty degrees.

It is to be understood that the curved inner surfaces of the ends of the outer, or overlapping, segment are correspondingly curved to make a nice fit on the overlapped ends of the segment.

When the four segments are in position for use, as shown in Fig. 2, the packing interiorly has a substantially continuous cylindrical wall, and exteriorly is cylindrical at the rear and conical in front, as shown, or it may be spherical.

The forward edges of the ends of the outer, or overlapping, segment are indicated by 15. In use, as the segments of the packing wear, and re-adjust themselves in the packing box, these edges 15 advance over the surfaces of the overlapped segments 10. In order to prevent cutting of the segments 10 by such advance of the edges 15 over their surface, the segments 10 may be provided with recesses 16 in front of such advancing edges 15. These recesses 16 are carried preferably both over the cylindrical part 10ᵇ of the inner segment and the conical, or spherical, part 110ª or 10ª. These recesses are preferably bounded by shoulders 17 lying substantially in registry with the edges 15 of the segments 11 when all four segments are new and in position as they lie in the packing cup, as shown in Fig. 2. Since the edges 15 of the segments 11 lie over these shoulders, they are thus prevented from cutting or digging into the segments 10 as they advance. These shoulders hold them a slight distance above the surface of the recesses 16 and thus effectually prevent cutting or digging. The recesses 16, however, are not continuous from one shoulder 17 to the opposite one, but between such shoulders there is provided a protuberance, or extension, 18. This extension, or protuberance, may lie only on the outer cylindrical surface of the packing, as shown in Figs. 1 to 4, inclusive, or it may also be carried over the forward conical, or spherical, part, as shown in Fig. 6. The shoulders 18ª, bounding this protuberance, are removed far enough from the advancing edges 15 of the overlapping segment to permit the ordinary advance of such edges in the ordinary use of the packing. The protuberances 18 project enough so that the outer cylindrical surfaces thereof, as shown in Figs. 1 to 4, bear against the wall of the retaining cup, thus preventing longitudinal tipping or rocking of the segment. In the form shown in Fig. 6, this protuberance is also carried forward over the conical, or spherical, part of the inner segment to engage the front face of the wall of the retaining cup to assist in preventing such displacement of the inner segment.

While I have shown and described certain embodiments of my invention, it is to be understood that it is capable of many modifications. Changes, therefore, in the construction, arrangement and operation may be made without departing from the spirit and scope of the invention disclosed in the appended claims, in which it is my intention to claim all novelty in my invention as broadly as possible, in view of the prior art.

What I claim as new, and desire to secure by Letters Patent is:

1. A packing including an overlapped segment, and an overlapping segment having curved contacting surfaces, the end of the overlapping segment being wedge-shaped and adapted to advance over the surface of the overlapped segment in use of the packing, and a protuberance on the outer surface of the overlapped segment lying in front of said advancing edge and spaced therefrom, the outer surface of said protuberance adapted to bear against the wall of a retaining cup to prevent longitudinal tipping or rocking of the overlapped segment.

2. A packing including as overlapped segment, and an overlapping segment having curved contacting surfaces, the end of the overlapping segment being wedge-shaped and adapted to advance over the surface of the overlapped segment in use of the packing, the outer surface of the overlapped segment being recessed in front of said wedge-shaped end of the overlapping segment whereby the end of the overlapping segment is prevented from cutting into the overlapped surface, and a protuberance on the outer surface of the overlapped segment in front of the wedge-shaped end of the overlapping segment, the outer surface of said protuberance adapted to bear against the wall of a retaining cup to prevent longitudinal tipping or rocking of the overlapped segment.

In witness whereof, I hereunto set my hand this 30th day of August, 1928.

JOHN LE MAY.